Jan. 19, 1937.  R. R. PITTMAN  2,068,510
ELECTRICAL CUT-OUT
Filed March 25, 1936
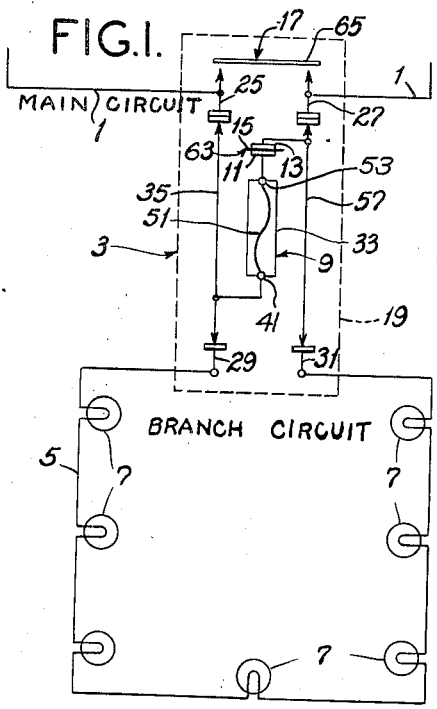
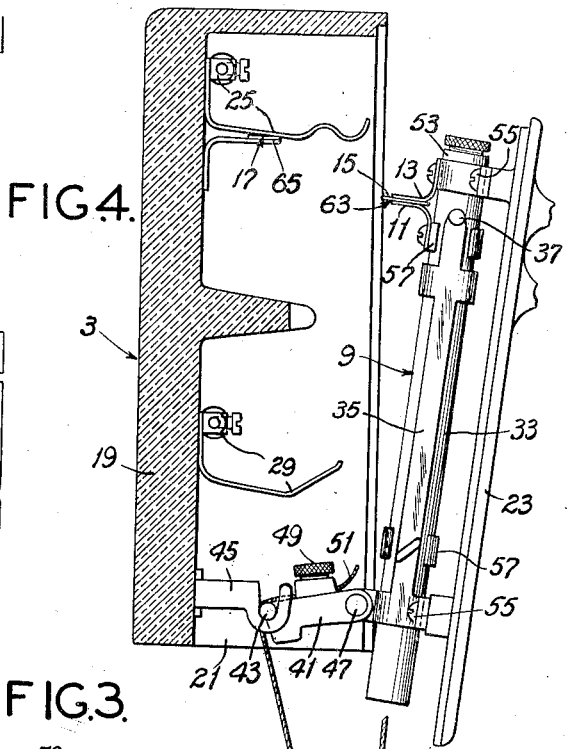
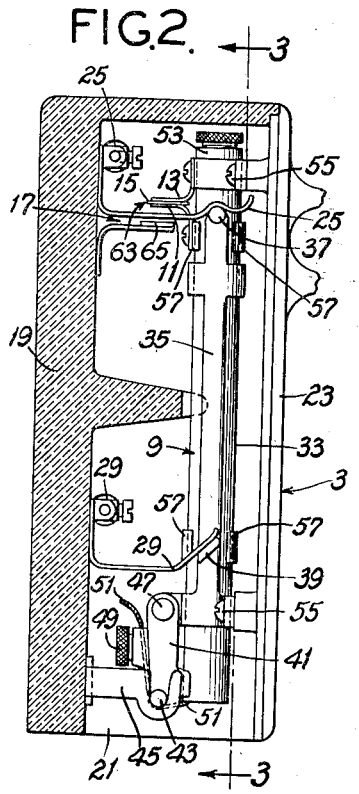
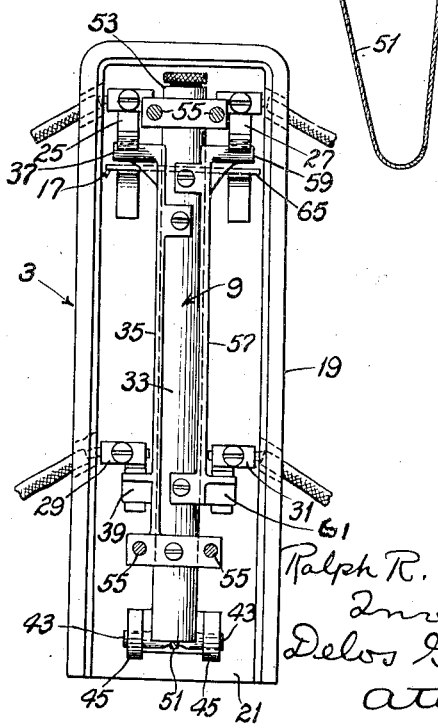
Ralph R. Pittman, Inventor.
Delos G. Haynes, Attorney.

Patented Jan. 19, 1937

2,068,510

UNITED STATES PATENT OFFICE 2,068,510

ELECTRICAL CUT-OUT

Ralph R. Pittman, Pine Bluff, Ark., assignor to W. N. Matthews Corporation, St. Louis, Mo., a corporation of Missouri Application March 25, 1936, Serial No. 70,782

15 Claims. (Cl. 200—118)

This invention relates to cutouts, and with regard to certain more specific features, to electrical cutouts for constant-current circuits.

Among the several objects of the invention may be noted the provision of a cutout for disconnecting from a constant-current main circuit a branch series circuit of the type commonly used for street lighting, the disconnection to be in response to a fault in the branch; the provision of a cutout which completely deenergizes the disconnected circuit; the provision of apparatus of the class described which, while it disconnects and deenergizes the branch circuit, at the same time maintains the continuity of service on the main circuit; the provision of apparatus of the class described which shall operate automatically to effect said objects in response to a fault condition in the connected branch circuit; and the provision of apparatus of this class which eliminates the uncertain outdoor operation of solenoids and the like; and which is simple in form and dependable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing in which are illustrated several embodiments of the invention, Fig. 1 is a circuit diagram illustrating the invention;

Fig. 2 is a vertical section taken through a fuse box embodying the invention;

Fig. 3 is a vertical section taken on line 3—3 of Fig. 2; and,

Fig. 4 is a view similar to Fig. 2 showing an alternative position of parts.

Similar reference characters indicate corresponding parts throughout the several views of the drawing.

It is known that branch street-lighting circuits and the like have their load elements (lamps) arranged in series and are energized from a constant-current main supply circuit, whereby the number of load elements may be varied to meet demand, without changing the current characteristics of any load element.

There have also been provided devices for restoring the continuity of a main circuit following the occurrence of a fault in a branch circuit. But such devices have provided no means of disconnecting and electrically isolating the branch circuit, with the result that a fault, such as a broken and fallen conductor, permitted the branch circuit to remain under potential from the main circuit. The hazard to life and property attending this condition has heretofore been well recognized but no solution has been presented for the problem.

Referring now more particularly to Fig. 1, there is shown at numeral 1 a main circuit which is equipped with apparatus such as a constant-current transformer or the like (not shown) for maintaining a constant current in said circuit 1. At numeral 3 is generally indicated the type of cutout to be disclosed in detail herein, and which connects said main circuit 1 with a series, loop circuit 5, such as is used, for example, in street lighting. The series circuit 5 has connected in series therein a number of lamps or load devices 7. The number of lamps is subject to variation. When the resistance of the series circuit 5 is changed, as by changing the number of lamps, the constant-current-maintaining apparatus in the main circuit 1 also maintains a constant current in the branch circuit 5. The voltage is changed according to the potential necessary for forcing current through the different resistances effected by changing the number of lamps.

One of the hazards associated with the circuit 5 is a broken wire. Under this condition current ordinarily ceases to flow around the branch circuit, but current may find its way to ground over the broken wire and through agencies such as the body of one who touches the wire or otherwise undesirably. At the same time the resistance of the grounded circuit may be so high that, in order to maintain its constant current output, the main circuit applies a dangerous voltage through the ground.

The cutout 3 broadly comprises conducting means 35 and 57 for disconnecting the branch circuit 5 from the main circuit 1, said means 35 and 57 being releasable to disconnecting position under mechanical control of a releasing fuse 9. The fuse 9 is connected across the conductors 35 and 57 and does not carry current under normal operating conditions of the branch circuit 5. This is because the fuse has in series therewith a film cutout element 63 composed of adjacent conducting plates 11 and 13 with an insulating film of paper or the like 15 therebetween. For instance, an equivalent of the paper film would be a calibrated air film or gap. However, the fuse 9 does receive current (to cause release to disconnecting position of the conducting elements 35 and 57) if there be a breakdown of the film 15, as under a condition of voltage increase. At the same time that the disconnecting members 35 and 57 disconnect the branch circuit 5, the main circuit 1 is re-closed by means of a shunt switch 17.

A typical physical embodiment of the cutout 3 is shown in Figs. 2 to 4. Numeral 19 indicates a porcelain insulating box having an open bottom 21 and a door 23. Within the box 19 at its upper end are supported main line terminals 25 and 27. In the lower end of the box are supported branch line terminals 29 and 31. As shown, the terminals 25, 27, 29 and 31 include suitable spring clips for making contact with certain elements to be described to form circuit disconnecting switches.

At numeral 33 is shown an insulating fuse tube having on one side, in the form of a bar, said conductor 35. The bar 35 has at its upper end a terminal-engaging element 37 for engaging the spring contact of the main line terminals 25, and near its lower end a terminal-engaging element 39 for spring contact with the branch terminal-engaging element 29.

Pivoted to the lower end of the bar 35 at 47 is a conducting supporting leg 41 having gudgeons 43 socketed in a support 45. The support 45 is carried in the box and supported on the rear wall 19. The leg 41 carries a clamp screw 49 for a fuse wire link 51 which passes around the pivoted leg 41 and into the open lower end of tube 33 and then through the tube to its top. At its upper end, the link 51 is fastened to a conducting contact head 53 which encloses the upper end of tube 33. Thus the fuse link 51 is adapted to be mechanically tensioned to hold the leg 41 substantially against the tube 33. Upon fusing, the link 51 releases the leg 41 so that the tube 33 may rotate with respect thereto as shown in Fig. 4, for purposes to be described. At this time rotation also occurs at the gudgeons 43. The spring bias of line terminals 25, 27, 29, 31, and gravity cause the movement illustrated.

The door 23 is supported on the tube 33 by means of fasteners 55 through the contact head 53 and through the lower end of the bar 35 respectively. In Fig. 3 the door does not appear.

Fastened to the other side of the tube 33 (Fig. 3) and insulated from the bar 35 is the second bar 57 having an upper terminal-engaging element 59 for contacting with the main line terminal 27; and also having a lower terminal-engaging element 61 for contacting with the branch line terminal 31.

The cap 53 is placed in potential electrical engagement with the bar 57 by means of the film cutout element 63. One plate 13 of this element 63 extends from the cap 53 and the other plate 11 extends from the bar 57. The paper or like insulator 15 lies between the plates 13 and 11, and is adapted to be punctured and to become current-carrying when voltages in excess of a predetermined amount are applied. Otherwise the paper functions as an insulator and prevents the flow of current between bars 35 and 57.

Below the spring extensions of the main line terminals 25, 27 is a lateral bar 65 which, when said spring extensions of main line terminals 25, 27 are not held up by the terminal-engaging elements 37 and 59, is contacted thereby to constitute the shunt switch 17.

From the above, it will be seen that the spring terminals 25 and 27, with the gudgeon contacts 37 and 59, form main circuit switches. The terminals 25 and 27 with the bar 65 form the shunt switch 17 for reclosing the main circuit when the main circuit switches open.

The spring terminals 29 and 31, with the gudgeon contacts 39 and 61 form branch circuit switches which open when the main circuit switches open, said main circuit shunt switch 17 closing under these conditions.

The downward pressure of the spring extensions of terminals 25, 27, 29 and 31 on the respective contacts 37, 59, 39 and 61 biases the tube 33 downwardly. This bias is resisted only so long as the fuse link 51 is intact (Fig. 2); otherwise the bias initiates movement of the fuse 9 as a whole (with the door thereon) as shown in Fig. 4. From the position shown in Fig. 4 the fuse 9 and door 23 may gravitate farther downwardly. Operation of the device is as follows:

Normally current flows from, say the left side of the main circuit 1, through main line terminal 25 (which is held up from the shunt bar 65), then through the bar 35, through the branch line terminal 29, around the branch circuit 5 to branch line terminal 31, bar 57, main line terminal 27 and back to the main line 1. Any current that tends to flow through the fuse link 51 is blocked by the film cutout 63, under the normal voltage condition which prevails in order to force the proper amount of current through the lamps 7.

If a break occurs in the branch circuit, its resistance is raised practically to infinity, or, in case of a ground, at least to a relatively high value, which immediately causes the apparatus in the main line circuit for maintaining constant current to increase the voltage, whereupon the film 15 of cutout 63 is punctured so as to permit current flow from the bar 35, through the fuse link 51, cap 53, film cutout 63, bar 57, and back to the main circuit 1.

The fuse link 51 is calibrated to fuse and open under the value of the constant current carried. This releases the mechanical connection between the conductor leg 41 and the tube 33, whereupon the latter is forced down by the spring extension of the terminal-engaging elements 25, 27, 29 and 31 (Fig. 4). Rotation occurs at the centers 43 and 47 and the door 23 is carried outwardly and downwardly with the fuse as a whole. This disconnects all of the terminal-engaging elements 37, 39, 59 and 61 from the line terminals 25, 29, 27 and 31, respectively. In other words, the main circuit switches and the branch circuit switches all open.

As a result, the branch circuit is entirely disconnected from the main circuit and carries no current and has no voltage impressed thereon. In this condition it is entirely safe until a repair is made.

At the same time that the branch circuit is disconnected from the main circuit, the spring extensions of the main line terminals 25, 27 drop down upon the shunt bar 65, thereby to directly connect said main line terminals 25 and 27. Thus operating conditions are re-established in the main circuit.

It is to be understood that other mechanical contrivances than those shown in Figs. 2–4 may be used for mechanically disconnecting the main and branch circuits upon blowing of the fuse link 51, such as for instance, the slidable fuse type of fuse disclosed in the copending application of Theodore Birkenmaier, Serial No. 66,179, filed February 28, 1936, for fuse, with suitable modifications.

From the above, it will be seen that when a fault occurs on the branch circuit, said circuit is immediately separated from the main circuit and is rendered dead. Any wire therein may thereafter be handled with safety. At the same time the main circuit is not left in an open condition, and hence service may be continued thereon. After repairs have been made in the branch circuit, the film cutout unit 63 is replaced and likewise the fuse 51. Upon re-closure, the fuse does not fall to the Fig. 4 position because of the link 51 rigidly holding up the terminal-engaging elements 37, 59 and 39, 61, so that these springingly engage the terminals 25, 27 and 29, 31 respectively. This condition prevails until the link again fuses.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. In a cutout, a fuse tube of insulating material, a pair of spaced conducting members secured to said tube and extending longitudinally therealong between the respective ends of said tube, contacts secured adjacent each of the respective ends of said conducting members, a fuse link within said tube, a dielectric element carried by said tube, means serially connecting said fuse link with said dielectric element, and means electrically connecting the series arrangement including said fuse link and said dielectric element between one of the contacts adjacent the lower end of one of the conducting members and the contact adjacent the upper end of the other conducting member.

2. A cutout comprising a fuse mechanism having open circuit and closed circuit positions, a fuse link in said fuse mechanism adapted when unfused to prevent movement of said mechanism from closed circuit position, but when fused permitting movement of the mechanism to open circuit position, and a dielectric element serially arranged with said fuse and adapted to break down to effect flow of current through the fuse only upon a predetermined voltage.

3. A cutout comprising a movable member having a closed and an open circuit position, a fuse mechanism associated with said movable member, a tensioned fuse link in said fuse mechanism which when unfused prevents movement of said control member from closed circuit position, but which when fused permits movement of the movable member to open circuit position, and a dielectric element serially arranged with said fuse and adapted to break down to effect flow of current through the fuse only upon a predetermined voltage.

4. In a cutout, circuit-connecting conducting means movable in a direction away from circuit-connecting position to disconnecting position, and means including a dielectric member and a fuse link associated with said conducting means, the dielectric member being serially arranged with said fuse link and adapted to break down to effect flow of current through the fuse link only upon a predetermined voltage, the fuse link restraining the movement of the conducting means when unfused, but when fused by means of said current permitting movement thereof to disconnecting position.

5. In a cutout, a movable element, circuit-connecting conducting means carried thereby, means biasing the movable element in a direction away from circuit-connecting positions to a disconnecting position, and means including a dielectric member and a fuse link carried by said movable element, the dielectric member being serially arranged with said fuse link and adapted to break down to effect flow of current through the fuse link only upon a predetermined voltage, the fuse link restraining the movement of the movable element when unfused, and when fused by means of said current permitting said biasing means to become operative to move the movable element from connecting to disconnecting position.

6. In a cutout, a movable mechanism, circuit-connecting conducting means supported thereby, means for biasing the movable mechanism in a direction away from circuit-connecting position to a disconnecting position, and means including a dielectric member and a fuse link carried by said mechanism, the dielectric member being serially arranged with said fuse link and adapted to break down to effect flow of current through the fuse link only upon a predetermined voltage, the fuse link restraining the movement of the mechanism when unfused, and when fused permitting said biasing means to become operative to move the mechanism to disconnecting position, said dielectric element being calibrated to determine the voltage at which current shall effect fusing of said link.

7. In a cutout, a movable element, circuit-connecting conducting means supported thereby, a mechanism associated with said movable element whereby it is movable, means biasing the movable element and mechanism in a direction away from circuit-connecting position to disconnecting position, and means including a dielectric member and a fuse carried with said movable element, the dielectric member being serially arranged with said fuse link and adapted to break down to effect flow of current through the fuse link only upon a predetermined voltage, the fuse restraining the mechanism in circuit connecting position when unfused, and when fused permitting said biasing means to become operative to force the mechanism and movable element to disconnecting positions, said dielectric element being calibrated to determine the voltage at which current shall effect fusing of said fuse link.

8. In a cutout, a movable element, electrically parallel conducting means carried thereby having with said movable element a circuit connecting position and a disconnected position, and means including a dielectric element and a fuse link serially arranged therewith and shunting across said conducting means, said fuse link being carried by said movable element and adapted to restrain the movement thereof to disconnecting positions when the fuse is unfused, the dielectric element being adapted to withstand normal voltages to prevent current flow through the fuse under conditions when it is desired to have said conducting means in connected position, but to break down under voltages corresponding to a condition in which it is desirable to have said conducting means in disconnecting position.

9. In a cutout, a movable insulating tube, conducting means carried thereby having with said movable tube a circuit-connecting position and a disconnected position, a mechanism adapted to guide the tube from connected to disconnected position, and means including a dielectric element and a serially arranged fuse link, said fuse link being partly in said tube and adapted to restrain the mechanism from assuming a disconnecting position when the fuse is unblown, the dielectric element being adapted to withstand normal voltages to prevent current flow through the fuse under conditions when it is desired to have said conducting means in connected position but to break down under voltages corresponding to a condition in which it is desirable to have said conducting means in disconnecting position.

10. In a cutout, a movable tube of insulating material, conducting means which is in a circuit-connecting position in one position of said tube and in a circuit-disconnecting position in another position of said tube, a fuse link and a dielectric element, the fuse link passing through the tube, means connecting said fuse link in series relation with said dielectric element, and means responsive to the electrical failure of said dielectric element and blowing of said fuse link to effect movement of said movable tube to effect a disconnected position of said conducting means.

11. A cutout comprising a movable element of insulating material, an electrical contact thereon, means comprising an unfused link associated with said insulating element for holding the latter in a normally closed circuit position of said contact, a dielectric element, means connecting said fuse link in series circuit relation with said dielectric element, said dielectric element being responsive to excess voltage to pass current through the fuse link to blow the same, whereby it can no longer hold the insulating element and contacts thereon in circuit closing position.

12. A cutout comprising movable engaging contacts adapted to assume engaging positions, means biasing said contacts away from engaging positions, means comprising a fuse link adapted to hold said contacts in engaging positions against said biasing means, a dielectric element in series with said fuse link, said dielectric element being responsive to only a predetermined voltage to permit flow of current through said fuse link, said fuse link being responsive to flow of current therethrough to melt and thereby to release said contacts to be biased by said biasing means away from contacting positions.

13. A cutout comprising movable switch element adapted to assume a connected position and disconnected position, means for latching said switch into connected position, a fuse link associated with the latching means and adapted to maintain the latched position of the same when unfused and when fused to release the same to unlatched position, said fuse being responsive to current to fuse, and voltage responsive means in series with said fuse link normally preventing current flow through the link but under abnormal voltage conditions permitting said current flow.

14. A cutout comprising a mechanism having two positions, contacts carried thereby having in one position of the mechanism a circuit closing position and in the other position of the mechanism a circuit opening position, mechanically tensioned means which by its tension holds the mechanism in circuit closing position of said contacts, said tensioned holding means being responsive to certain current flow to have the tension released and to release the mechanism for movement to open circuit position of said contacts, and dielectric means in series with said holding means which resists current flow therethrough under normal voltage, but which permits flow of said current therethrough under abnormal voltage whereby said tension and said mechanism is released.

15. A cutout comprising a mechanism having a latched and an unlatched position, contacts carried thereby having in the latched position of the mechanism a circuit closing position and in the unlatched position of the mechanism a circuit opening position, means biasing the mechanism to open circuit position, mechanically tensioned means which by its tension holds the mechanism latched in circuit closing position of said contacts and against said biasing means, said tensioned holding means being responsive to current flow to have the tension therein released and to unlatch the mechanism for movement in response to said biasing means to open circuit position of said contacts, and dielectric means in series with said holding means which resists current flow therethrough under normal voltage, but which permits flow of said current under abnormal voltage.

RALPH R. PITTMAN.

DISCLAIMER 2,068,510.—*Ralph R. Pittman*, Pine Bluff, Ark. ELECTRICAL CUT-OUT. Patent dated January 19, 1937. Disclaimer filed February 15, 1940, by the assignee, *W. N. Matthews Corporation*; the inventor, assenting and concurring.

Hereby disclaims from said patent the claims numbered 2, 3, 4, 5, 6, 7, 8, 10, 11, 12, 13, 14, and 15.

[*Official Gazette March 5, 1940.*]